June 16, 1964  L. J. CARPEZZI  3,137,512
HEIGHT ADJUSTABLE DOLLY
Filed Aug. 11, 1961  3 Sheets-Sheet 1
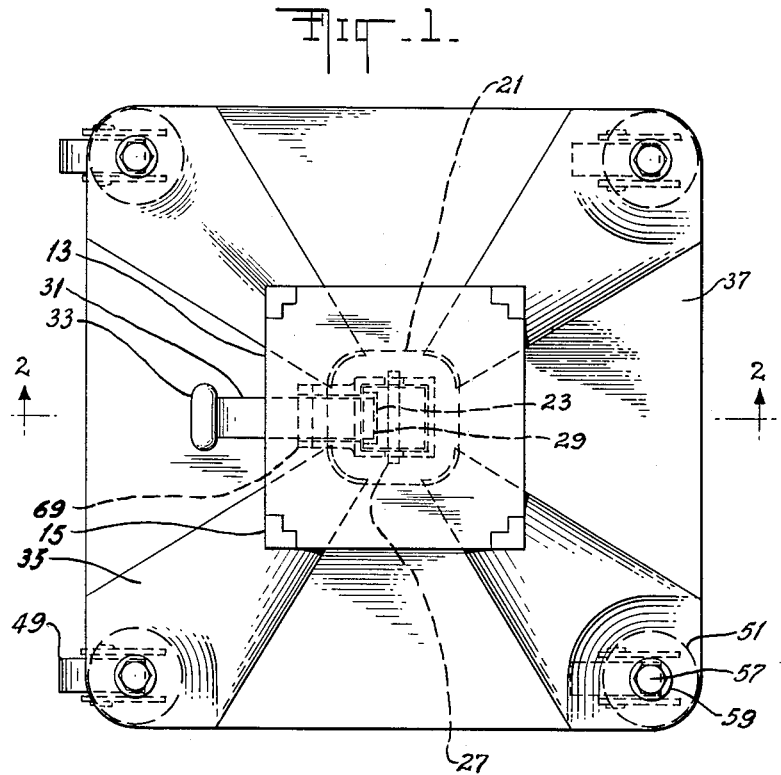
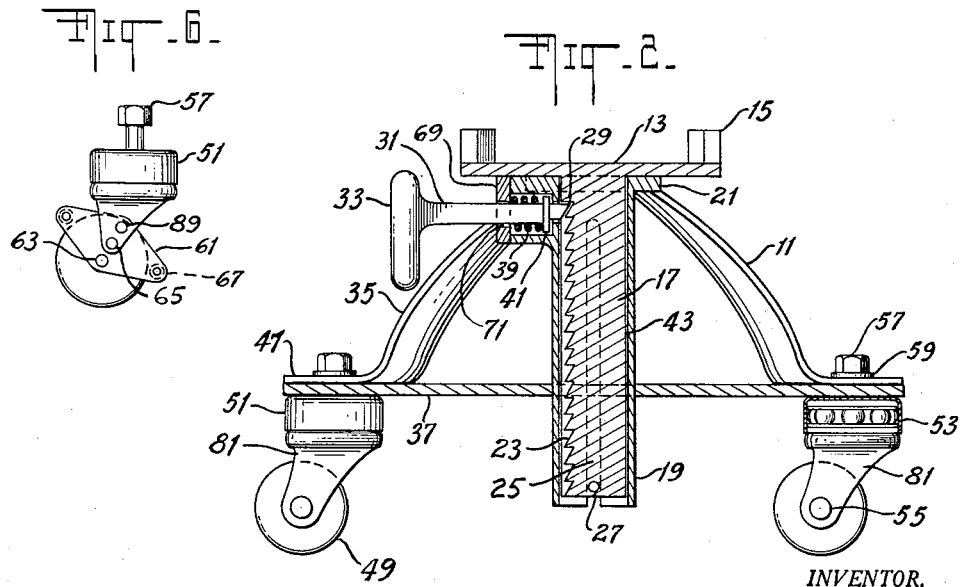
INVENTOR.
LEO JOSEPH CARPEZZI
BY Murray M. Grill
ATTORNEY

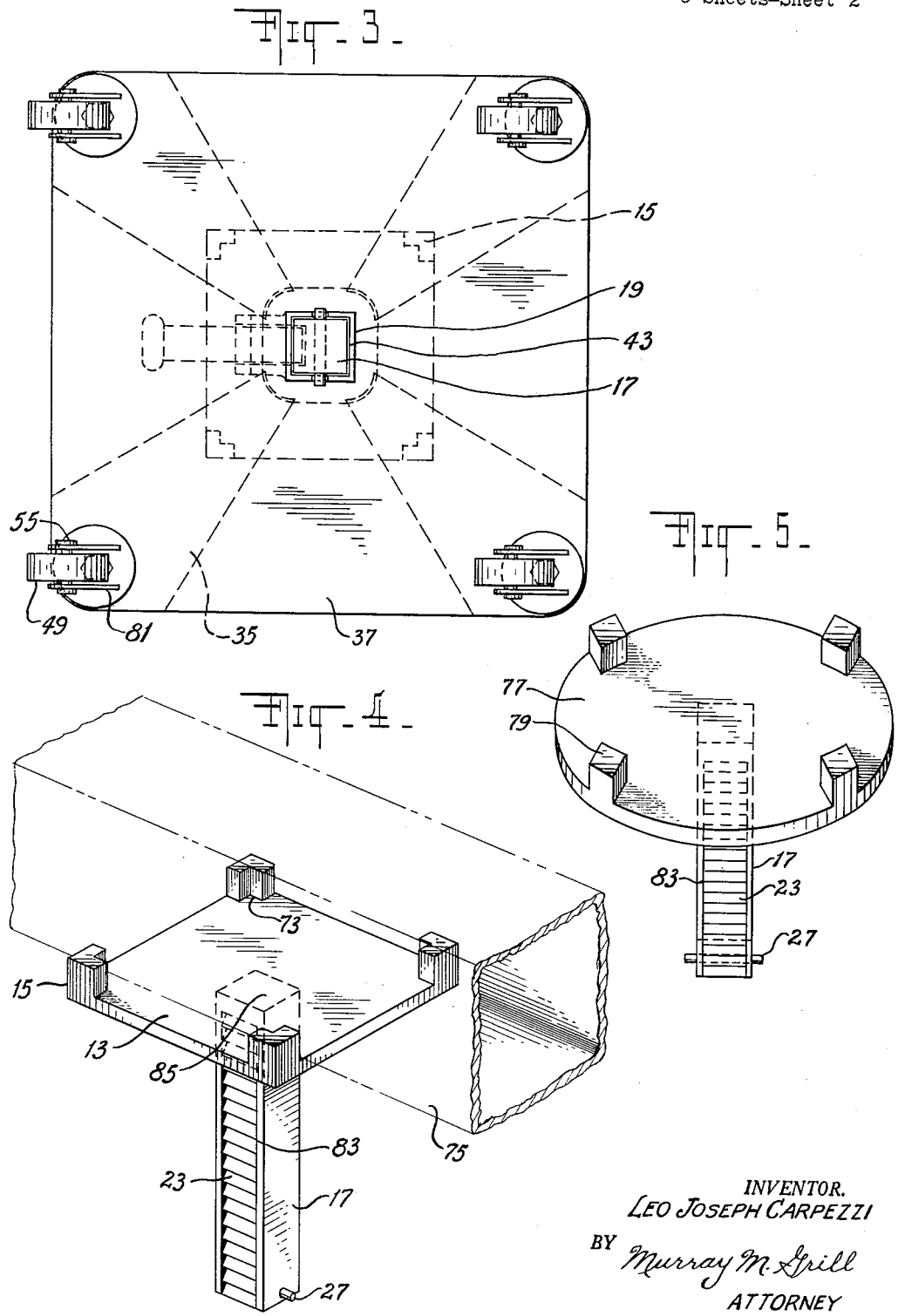

June 16, 1964

L. J. CARPEZZI 3,137,512

HEIGHT ADJUSTABLE DOLLY

Filed Aug. 11, 1961

INVENTOR.
LEO JOSEPH CARPEZZI
BY Murray M. Grill
ATTORNEY

United States Patent Office 3,137,512
Patented June 16, 1964

3,137,512
HEIGHT ADJUSTABLE DOLLY
Leo Joseph Carpezzi, 3817 Fort Hamilton Parkway,
Brooklyn, N.Y.
Filed Aug. 11, 1961, Ser. No. 130,888
5 Claims. (Cl. 280—35)

This invention relates to a dolly useful to support a portion of an automobile frame. When a plurality of dollies is employed, preferably four, one at each corner of the automobile frame, the frame and automobile body thereon may be moved easily to desired position to facilitate work on the automobile, such as body repairs.

Previous to the present invention, various methods and apparatus have been employed to support automobiles when necessary to effect repairs thereon. Jacks, both mechanical and hydraulic, have been applied to car bumpers, axle housings, frames and other sturdy automobile elements. Cars have been driven up ramps or over grease pits to make it possible to obtain access to the under portions. Jacks have been used to raise automobiles, which then are blocked in position. All of these methods possess inherent disadvantageous properties which limit their utility and have made them unsatisfactory for use in the usual body repair shop operations. The present invention, on the other hand, provides an efficient, economical and effective means for maintaining a car body in stable, yet mobile, position so that access can be readily obtained to any portion thereof, with minimum working space requirements.

In accordance with this invention there is provided a horizontally movable and vertically adjustable support or dolly capable of being placed in supporting position under a portion of an automobile frame comprising a platform wider than the automobile frame and on which the frame may be rested, means extending upwardly from the platform, such as peripheral projections, for limiting relative sliding movement between frame and platform, a vertical supporting member extending downwardly from the center of the platform and joined to it, the vertical member having surface irregularities, a vertical tube for enclosing the vertical supporting member and in which it can be moved vertically, means on the tube for adjustably fitting with the surface irregularity of the vertical member to hold it in fixed vertical relationship with the tube, four swivel wheels and means for supporting the tube upon the swivel wheels and for holding the wheels apart so that the tube is above a horizontal surface upon which the wheels may be rested and is at the center of the wheels and the wheels are apart a greater distance than the tube height.

Also in accordance with the invention is a process for repairing an automobile body which comprises elevating the automobile body, preferably by means of a jack or jacks, placing under the frame of the body at four portions thereof near the respective corners of the body, four mobile supports such as dolly supports of the type described in this patent application, with the upper supporting surfaces of the supports in contact with the under surfaces of the body frame, lowering the automobile body onto the dolly supports so that they sustain the weight of the body, moving the mobile supports and the supported automobile body as a unit horizontally to desired position and braking the mobile supports to hold the automobile body firmly and safely in desired position.

It is an object of the present invention to provide a support for an automobile body to be repaired which is economical of construction, stable, yet mobile, easily used and capable of facilitating the repair of automobile bodies in restricted spaces, such as small garages.

It is another object to provide a simple, efficient support for attachment to the desired portions of an automobile body frame which is constructed so that the automobile frame and four such supports can be moved in any horizontal direction, as a unit, so that the automobile frame may be easily placed in most desirable position for the job to be done thereon.

It is also an object to provide an inexpensive stable, mobile support which can be used to support automobile frames at whatever height is most desirable for repair work without inclusion in the support of means for elevating the automobile frame, so that by means of these supports and a single jack, automobile bodies may be elevated to desired position and held there during body repair work.

It is a further object to provide a mobile dolly support of adjustable height capable of being locked in position against either vertical movement of the supporting means or horizontal movement of the dolly.

Another object of the invention is to provide a mobile dolly which is vertically adjustable and has a platform at the top thereof adapted to fit a portion of an automobile frame.

Still another object is to have at the top of the supporting platform a plurality of projections adapted to limit the movement of an automobile frame with respect to the platform.

Also an aim of the invention is to provide a dolly support for automobile bodies in which the platform member and vertical support attached thereto are integral and the supporting legs and enclosure for the vertical support are also integral.

An additional aim is to overcome the problems attendant repairing automobile bodies in restricted spaces by providing a method in which the frame of a body to be repaired is held elevated on four dollies which are of adjustable height and is then moved to desired working position.

Other objects of the invention will be apparent from the following description, taken in conjunction with the accompanying drawing in which:

FIG. 1 is a top plan view of the invented support;

FIG. 2 is a vertical section along plane 2—2, illustrating the ball-bearing construction of a caster wheel and the spring-loaded locking means for holding the vertical support in place unsectioned for clarity of illustration;

FIG. 3 is a bottom plan view of the invention;

FIG. 4 is a perspective view of the vertical supporting member attached to a platform containing raised projections which limit the relative movement between a portion of an automobile frame, shown in phantom lines, and the platform;

FIG. 5 is a similar perspective view of vertical support and a different type of platform;

Figure 7:
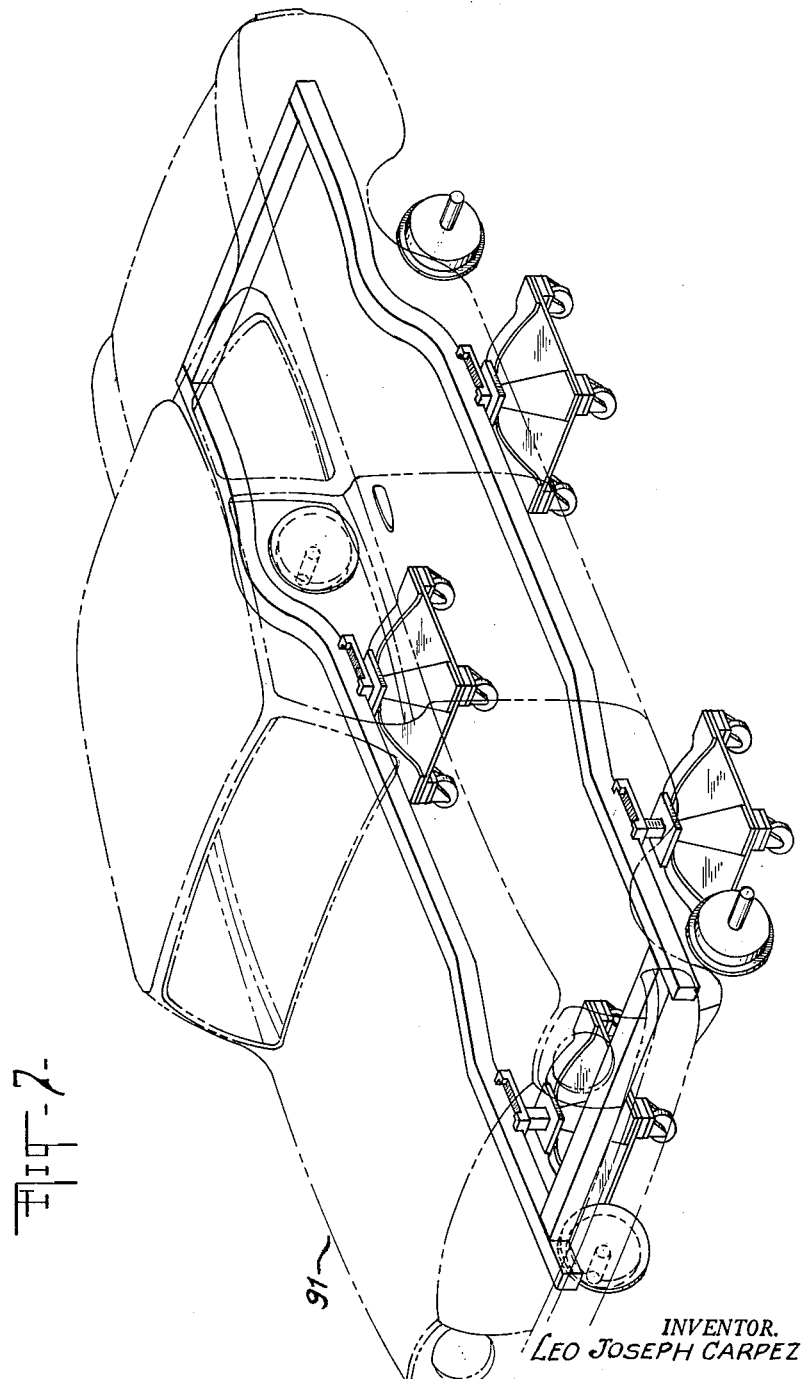

FIG. 6 is a view of one embodiment of a caster having braking means, such a type of caster being preferred with the dolly support of this invention; and FIG. 7 is a perspective view of an automobile body mounted at four suitable portions of the frame on four dolly supports of the invention, so that the body may be easily rotated or otherwise moved horizontally to desired position for body repair work.

Numeral 11 designates the height adjustable dolly or horizontally movable and vertically adjustable non-elevating support of this invention. It comprises a platform 13 containing projections 15 and a vertical supporting member extending downwardly from the platform and joined to it at the center thereof. Vertical supporting member 17 is preferably integral with the platform 13. It may be welded, bolted or otherwise fastened but is preferably cast with the platform, meeting it at 85. Platform 13 should be wider than the width of the bottom surface of an automobile frame to be rested on it so that the frame 75 may be well supported and so that the means 15 extending upwardly from the platform for limiting relative sliding movement between frame and platform will guide the frame into place and will hold it snugly and limit or prevent relative sliding movement between frame and platform.

Vertical member 17 is preferably of square cross-section with a row of surface irregularities, depressions or teeth 23 along at least one side thereof, preferably with a flat edge 83 along a side of the toothed section. The surface irregularities should extend along the whole side of the vertical support to permit setting of the support height at a desired position over a wide range of settings. At the bottom of vertical member 17 is means 27 for limiting movement of the vertical support within tubular enclosing means 19. Pin 27 rides in a pair of opposed tracks or slots 25 in vertical enclosing tube 19 and the slots may be so terminated as to limit relative movement of the tube and support. The tubular enclosure 19 and vertical supporting means 17 are of such vertical dimensions and the pin 27 and the slots 25 or other movement limiting means are so located that whether in elevated or lowered positions the dolly stably supports the applied vertical load.

On the tube 19 spring loaded locking means 29 in the form of pointed or tapered element which engages surface depressions 23 in support 17 adjustably engage the depressions at any desired height and lock the dolly support at that height, at least insofar as downward movement is concerned. As will be seen from the drawing, if the spring is not of too great a spring constant, in other words if it is comparatively weak, the downward taper of the locking means 29 at the end thereof will allow upward movement of the support because the tapered surface irregularities 23 act to push locking means 29 away from locking contact therewith when the vertical support 25 is raised. To lower the support 17, a handle 33 is provided attached to shaft 31 connected with locking means 29. Spring 39, which presses shoulder 41 and locking means 29 into locking position, can be compressed and the notches 23 may be disengaged by pulling the handle 33 away from support 17. Spring 39, shoulder 41, locking means 29 and a part of shaft 31 are positioned within an enclosure made by a horizontal extension of a wall of tube 19, preferably cast with the tube 19, and an apertured end plate 69 through which shaft 31 passes with clearance 71.

At the top of tube 19 and below the platform 13 is flange 21 on the tube. This flange provides a rest for the platform and may itself act as a stop, preventing further downward movement of the platform. Also, the flange 21 is suitable for mounting of legs 35 to the tube. It is preferred to have the legs integrally joined to the tube, preferably by being cast therewith and usually made of steel, cast iron or other suitable strong material of construction. As shown, four legs 35 are concavely curved from flange 21 to the bottoms of the legs where they flatten to horizontal sections 47 which are attached to casters. For increased strength the legs are also fastened to tube 19 by reinforcing means, shown as a horizontal plate 37, which connects the legs to each other and to each other and to the tube. Thus, when the legs are mounted a sufficient height above a horizontal supporting surface for the tube 19 just to clear it, a stable support of adjustable height is made in which support 17 rides snugly in tube 19, held in place by slots 25 and pin 27, locking member 29 fitting depressions 23, the corresponding cross-sectional shapes of the tube 19 and vertical member 17, if other than circular, and the small clearance 43 between them. It will be seen that the leg ends, where casters are to be attached, are apart from each other distances greater than the tube height and the tube is in the center of the caster wheels. This is an important provision for stabilizing the present dollies.

To allow the invented support to be used as desired and in an efficient manner, casters 51 are joined, one to each leg, by tightening of nuts 57 against washers 59 and onto the bolts of the casters, which pierce leg horizontal terminal portions 47 and horizontal plate 37. Although, for ease of illustration ordinary casters of the non-locking type are illustrated in FIGS. 1–3, it is highly preferred to employ locking casters, one design of which is shown in FIG. 6. At least one of such braking casters should be employed on a dolly and preferably all four casters of the dolly should be capable of being locked in place to prevent horizontal movement of the dolly when it is desired to be held firmly in place. Whether braking or freely moving at all times, the casters should have wheels which readily change direction when the dolly is being moved. To accomplish this the wheels 49 may be mounted on axles or pins 55 which are fastened to offset sides 81 joined to the housing of caster 51. In that housing is a race in which ball bearings 53 rotate and revolve to allow turning of wheel 49 with minimum friction.

Instead of the caster described, any suitable locking type may be employed. In that shown in FIG. 6, a pair of shields 61 is mounted on the caster wheel at pin 63 and is joined to the sides of the caster at pins 65. Pins 89 or other fitting devices hold the shields to the caster sides when in position for moving but when it is desired to brake, one end of shields 61, that shown lower in FIG. 6, is depressed. This disengages pins 89 from holding the shields to the caster sides and the weight of the dolly, together with the share of the load of a supported object transmitted, causes pin 67 to lock against the wheel.

In FIGS. 4 and 5 are shown different types of projections extending upwardly from the supporting platforms for the automobile frame. In FIG. 4 the projections 73 are located at the corners of the square platform 13 and are of regular notched shape better to allow holding of some frames of complementary shape. Frame 75 is illustrated resting on platform 13. In FIG. 5 the projections 75 for guiding the frame into place and holding it steady are located on the periphery of the circular platform 77. The distances between projections are here different so that by turning the platform or by turning the dolly and the platform it may be adapted to support frames of at least two different frame widths.

The details of the various manipulative operations followed when the present dollies are employed to support and move an automobile frame are mentioned in or are evident from the description of the structure of the dolly, previously given. Therefore, in the following description of a process of supporting and positioning an automobile body for repairs to be made thereon, only the more general operations will be discussed. In FIG. 7 an automobile body is illustrated stably suspended above four wheeled dollies, the platforms of which support the automobile frame at four points, preferably just behind the front wheels and just ahead of the rear wheels or axles. To arrive at this state, the car body was first jacked to desired height, after which the mobile supports were positioned, raised to frame heights and locked at the desired heights. The weight of the body itself is enough to hold each dolly tightly to the frame upon removal of the jack or jacks, whereupon the dollies combine to support the body frame at the desired height. Instead of placing all four dollies in position while the frame is being held elevated at all four points where dollies are to be attached, a single jack may be used to elevate the frame sequentially at each support point, whereupon it may be removed after placement of a supporting dolly and used to raise another section of frame. Of course, following this method, the frame may be raised only part way at one support point and later may be raised an additional distance. Jacks employed are of any suitable design and, because they are conventional, have not been illustrated here.

After the automobile body 91 has been supported at desired height, it is moved as a unit by rotational and translational movement to desired working positions. Moving is effected by exerting lateral forces on the body itself, the dolly moving along therewith. Then, the dolly wheels are braked and thus, the frame and body are held firmly in place against horizontal movement during necessary repair operations. In this position and condition the repair work is done, after which the body is lowered by reversal of the operations previously described.

The advantages of the invention are evident from the foregoing description and the objects previously recited. Principally, it provides an efficient, sturdy, economical means and process for holding elevated and moving an automobile body to desired position in a limited space. The same means locks the suspended automobile body in position and holds it so steady that heavy repair work, such as extensive body and fender repairs, may be undertaken without fear of the body shifting or slipping off the supports. Furthermore, the body is held more positively on the frame than it is held by support of a body part, such as a wheel or axle, which in itself may not be fastened firmly to the body. Of course, the invented dolly may also be used to support automobile bodies by parts thereof other than the frame but in such situations the best type of support is not obtained. With the aid of the described dollies fastened to the automobile frame at the four frame positions mentioned, an automobile body may be placed in repair position with only the use of one ordinary jack capable of raising a part of an automobile frame.

The invention has been described with references to illustrations of embodiments thereof shown in the drawing. The invention is not limited to the illustrated subject matter but, rather, encompasses the full range of the claims, as written, including apparatuses and processes in which equivalents of the elements of the claims have been substituted therefor.

What is claimed is:

1. A horizontally movable and vertically adjustable non-elevating dolly support for a portion of an automobile frame, for use when an automobile body is being repaired, which comprises a rigid, horizontally-fixed plaform wider than the automobile frame and on which the frame may be rested, upwardly extending projections on the top of the platform spaced about the periphery thereof for guiding and positioning of the frame and for preventing sliding movement of the frame on the platform, a vertical supporting member extending downwardly from the center of the platform and rigidly joined thereto, said vertical member having a row of surface depressions along its length, a vertical tubular enclosure substantially coaxial with and enclosing the vertical supporting member and in which it can be moved vertically, adjustable locking means on the side of the tubular enclosure for normally engaging a surface depression of the vertical member and holding it in fixed relationship with respect to said enclosure, capable of being withdrawn from said engagement to allow vertical adjustment of the support, four legs connected at their tops to the vertical tube enclosure and diverging therefrom at their lower ends, the lower ends of said legs and of said tube being affixed to a common horizontal base which holds the legs apart and the tubular enclosure in a central location therebetween, four swivel wheels, each affixed to the underside of said base at the point at which each of said legs is attached thereto, and fastening means connecting said legs, swivel wheels and base, the legs and tube being of such proportions and sizes that the tube is held above a horizontal surface upon which the wheels may be rested, the wheels being apart a greater distance than the tube height and the adjustable support being stable in use in both uppermost and lowermost positions.

2. A dolly support according to claim 1 in which said horizontally-fixed platform has four upwardly-extending projections on top of the platform, said projections being spaced rectangularly so as to fit closely automobile frames of at least two different sizes.

3. A dolly support according to claim 1 in which said swivel wheels are mounted on ball-bearings.

4. A dolly support according to claim 1 in which at least one of the swivel wheels has braking means thereso that the dolly can be held fixed in position on a horizontal surface on which it is rested.

5. A dolly support according to claim 1 in which said four legs are concavely curved between the ends thereof.

References Cited in the file of this patent

UNITED STATES PATENTS

| | | |
|---|---|---|
| 644,534 | Nagley | Feb. 27, 1900 |
| 864,680 | Neirlle et al. | Aug. 27, 1907 |
| 911,149 | Moore | Feb. 2, 1909 |
| 1,113,140 | Priest | Oct. 6, 1914 |
| 1,604,723 | Rutherford | Oct. 26, 1926 |
| 1,632,435 | Darnell | June 14, 1927 |
| 1,792,673 | Amstutz | Feb. 17, 1931 |
| 1,832,041 | Moehler | Nov. 17, 1931 |
| 2,170,012 | Cronk | Aug. 22, 1939 |
| 2,246,882 | Gentry | June 24, 1941 |
| 2,490,210 | Cramer et al. | Dec. 6, 1949 |
| 2,547,211 | Holmes | Apr. 3, 1951 |
| 2,718,405 | Casey | Sept. 20, 1955 |